Figure 1:
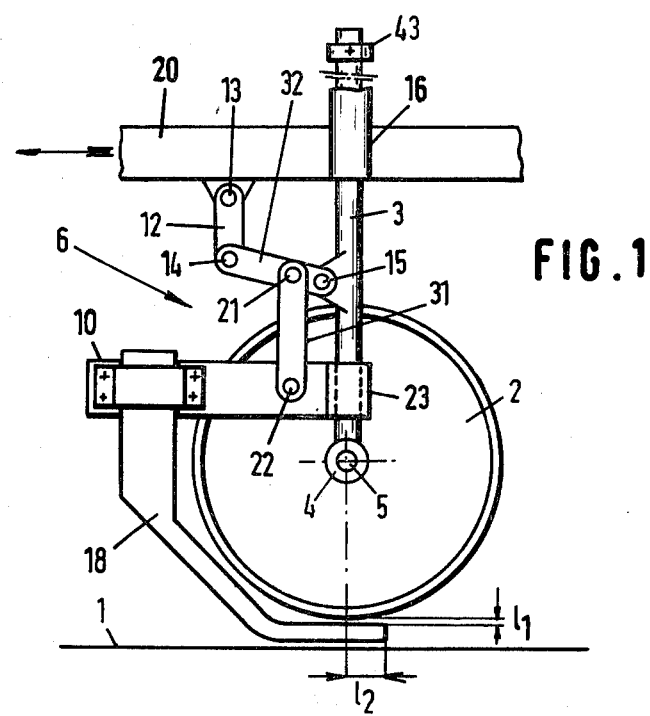

United States Patent [19]

Kloppenburg

[11] 4,263,773
[45] Apr. 28, 1981

[54] BEET TOPPING DEVICE

[75] Inventor: Willem Kloppenburg, Munnekezijl, Netherlands

[73] Assignee: Landbouwmechanisatiebedrijf W. Kloppenburg, Munnekezijl, Netherlands

[21] Appl. No.: 30,698

[22] Filed: Apr. 16, 1979

[30] Foreign Application Priority Data

Apr. 17, 1978 [NL] Netherlands .................. 7804081

[51] Int. Cl.³ .................................. A01D 23/04
[52] U.S. Cl. ............................................. 56/121.4
[58] Field of Search .............. 56/121.4, 121.41–121.46

[56] References Cited
U.S. PATENT DOCUMENTS

| | | | |
|---|---|---|---|
| 913,421 | 2/1909 | McCormick | 56/121.4 |
| 1,045,074 | 11/1912 | Pingree | 56/121.4 |
| 1,280,156 | 10/1918 | Campbell | 56/121.4 |
| 1,308,921 | 7/1919 | Smith | 56/121.4 |
| 2,429,044 | 10/1947 | Bassett | 56/121.4 |

*Primary Examiner*—Robert A. Hafer
*Attorney, Agent, or Firm*—Watson, Leavenworth, Kelton & Taggart

[57] ABSTRACT

A beet topping device transportable over the ground, comprising a frame, a polygonal construction, in particular a quadrangular construction or quadrangular linkage movably connected to the frame, via at least one pivot shaft and variable in position relative thereto, a blade holder connected movably relative to the frame via a feeler arm in a first point of application to the quadrangular linkage, while furthermore the connection arm is slidable relative to the feeler arm and optionally connected therewith and the feeler and blade holder are positioned outside the quadrangular linkage.

13 Claims, 15 Drawing Figures

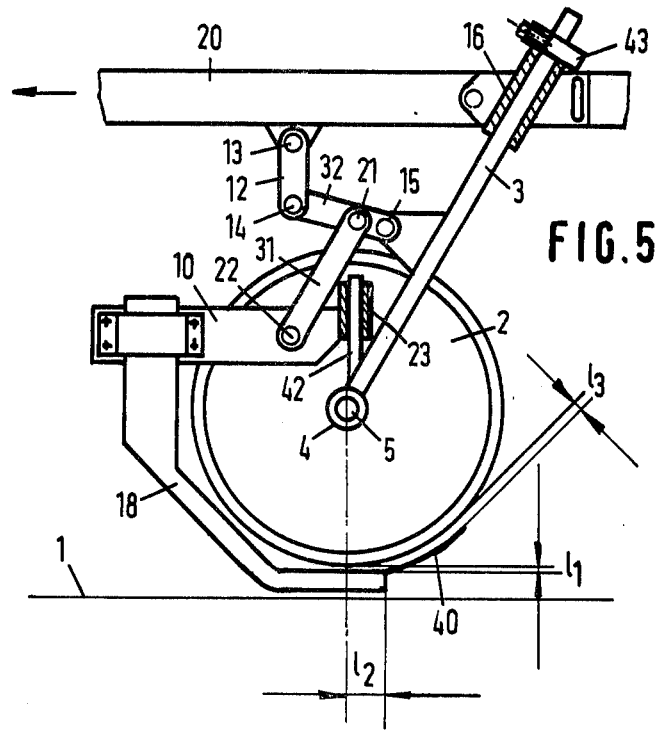
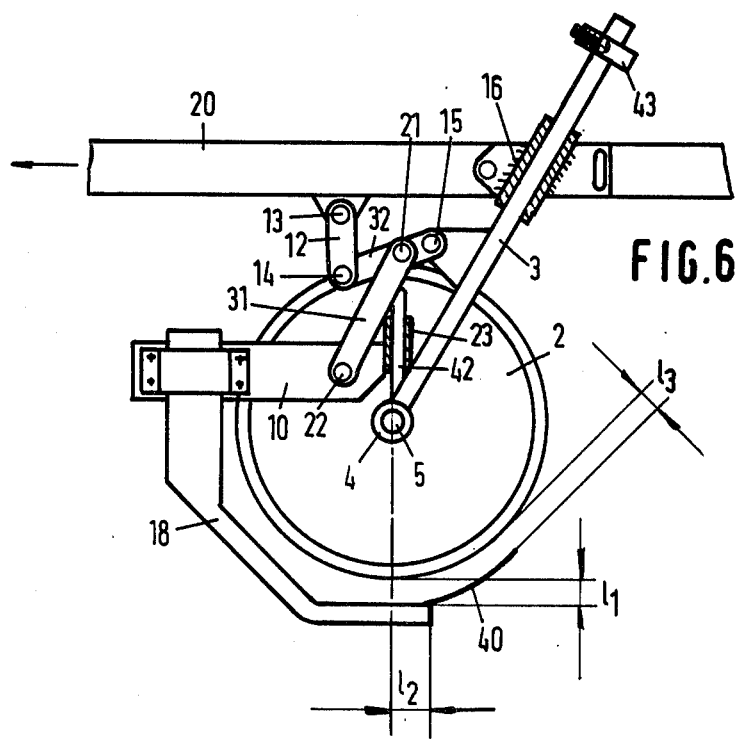

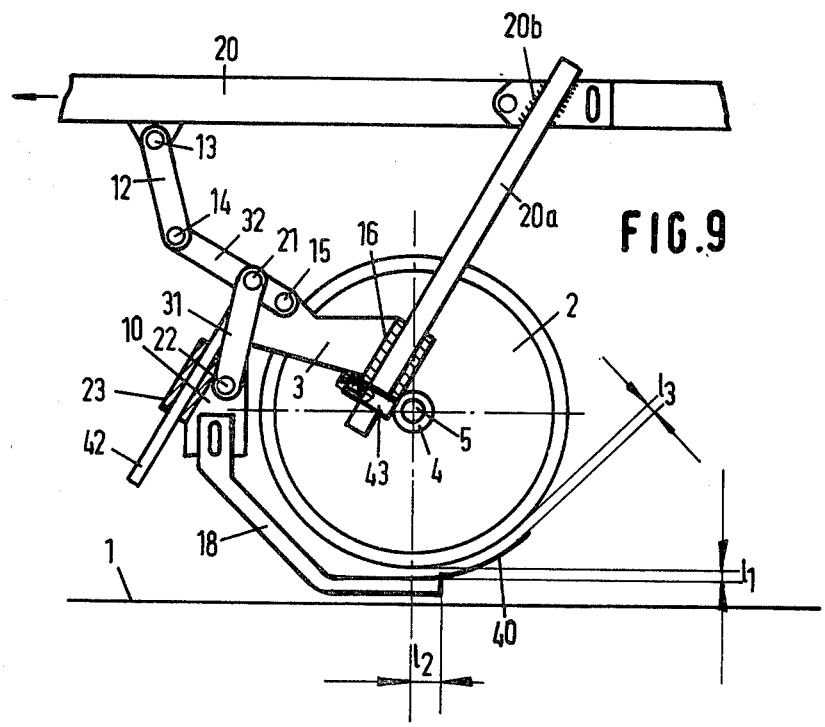
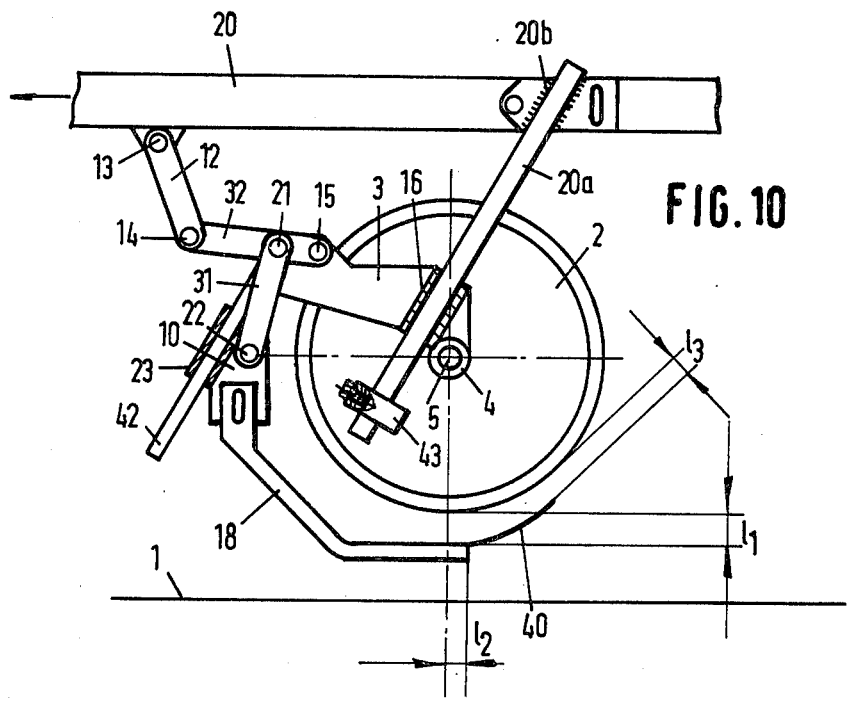

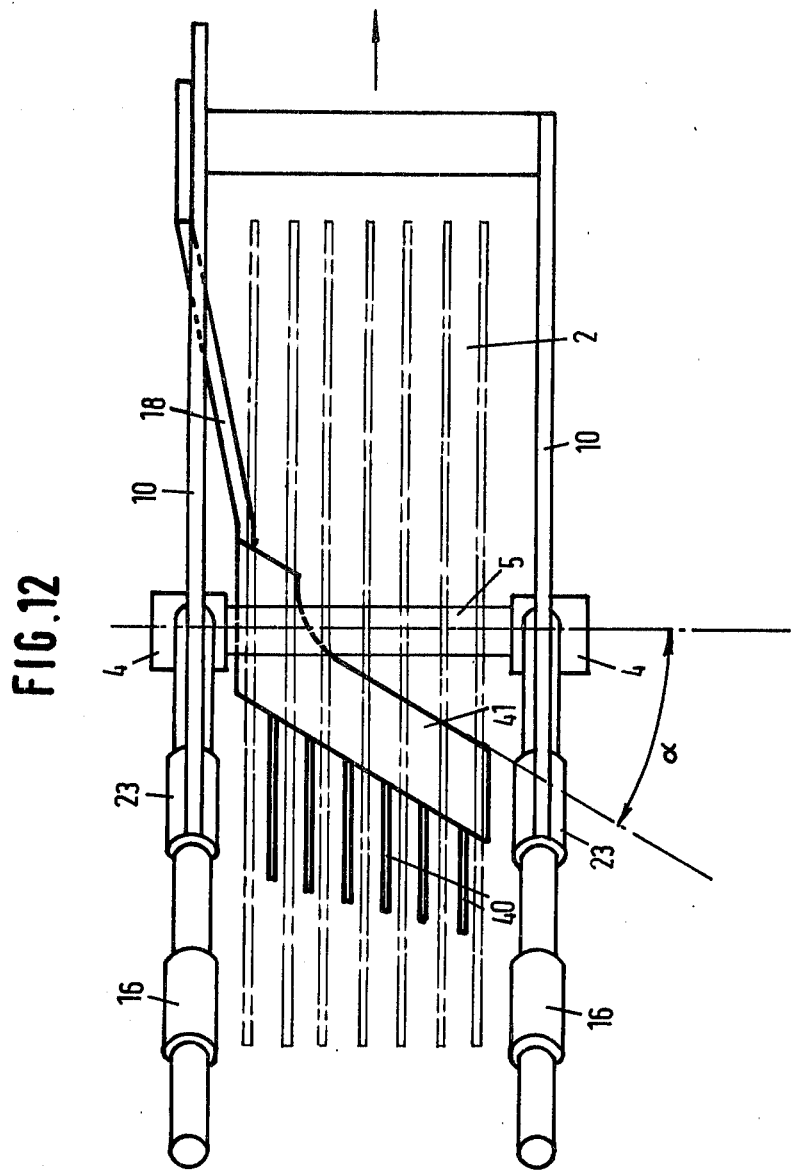

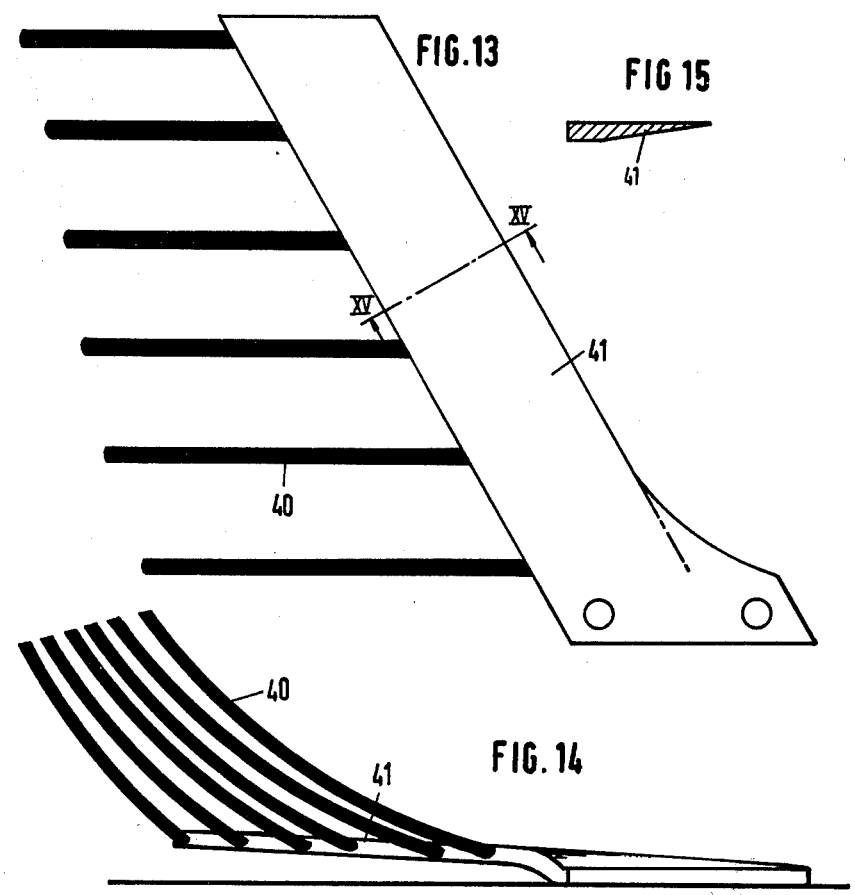

BEET TOPPING DEVICE

The invention relates to a beet topping device transportable over the soil and comprising a stationary frame having a front or transport direction side and a rear or trailing side, and furthermore comprising a system of rods which via movable interconnection points are composed to a deformable polygon, in particular quadrangle construction or quadrangular linkage, in which a first and second coupling point of the quadrangular linkage are connected to the frame, at least one of the first or second coupling point being a connection with the frame pivotable about a horizontal axis, while the third and fourth coupling point of the quadrangular linkage are connections pivotable about a horizontal axis; a feeler connected to a feeler arm and movable over the soil, which feeler arm is movably attached to the frame via the quadrangular linkage; a cutter member comprising a topping blade the cutting edge of which is directed towards the transport direction side and which is connected to a topping blade arm which, via the quadrangular linkage, connects the topping blade to the frame in a manner variable with respect to the vertical position of the topping blade relative to the frame.

Such a device is known from French Pat. No. 1,308,370. In the prior art device the quadrangular linkage is designed as a parallelogram construction, whose two coupling points to the frame are both a connection pivotable about a horizontal axis. In the prior art device the possibility is offered to top the beets independently of the height of the haulm-carrying part thereof, projecting above ground, always with a cutting face substantially parallel to the surface in combination with a vertically self-adjusting variable distance between topping blade and feeler.

It is the object of the present invention to provide a beet topping device of a construction on the basis of which it is possible during topping not only to make the position of the feeler vertically self-adjustable relative to the topping blade, but, if desired, also horizontally. As a result a beet topping device is obtained that is universally applicable both according to the nature of the beet crop and according to the type of soil on which they are grown.

According to the invention, within the scope of the beet topping device mentioned in the above, there is now provided an improved device which is characterized in that the point of application of the topping blade arm on the quadrangle linkage is disposed between the second coupling point, which is pivotally connected to the frame about a horizontal axis and the point of application of the feeler arm on the quadrangular linkage, the first coupling point with which the quadrangular linkage is connected to the frame is a sliding joint, and the blade holder outside the quadrangular linkage, through the intermediary of a connection arm comprising a sliding joint, is slidable relative to the feeler arm and optionally connected therewith.

Figure 2:
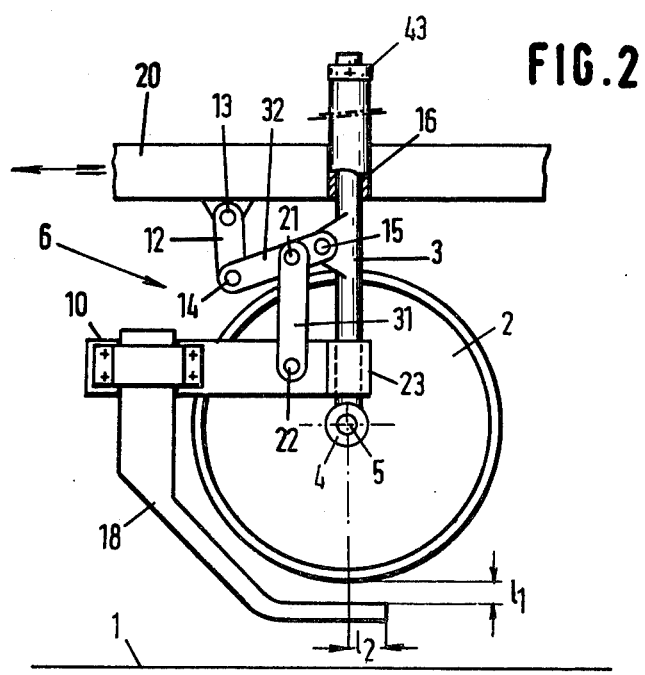
Figure 3:
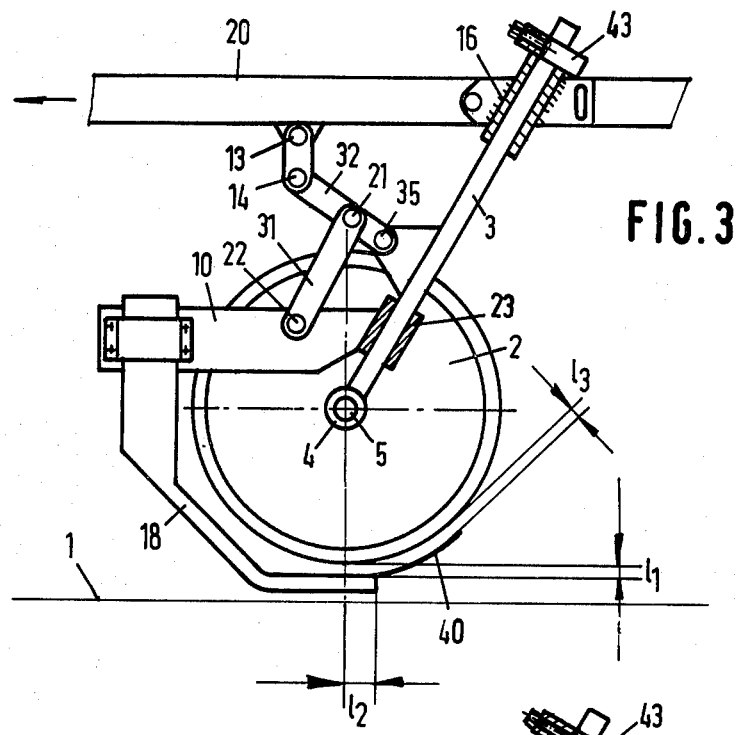
Figure 4:
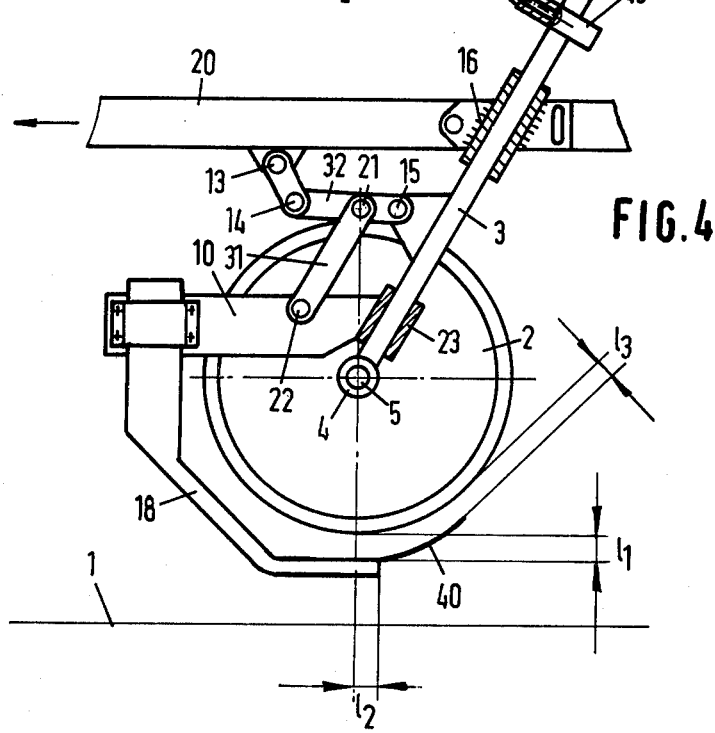
Figure 7:
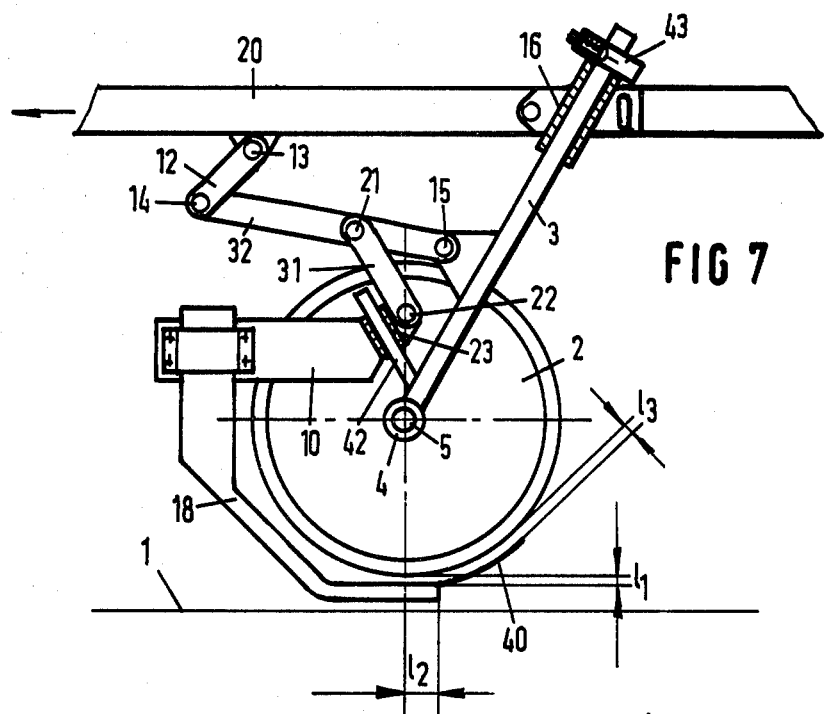
Figure 8:
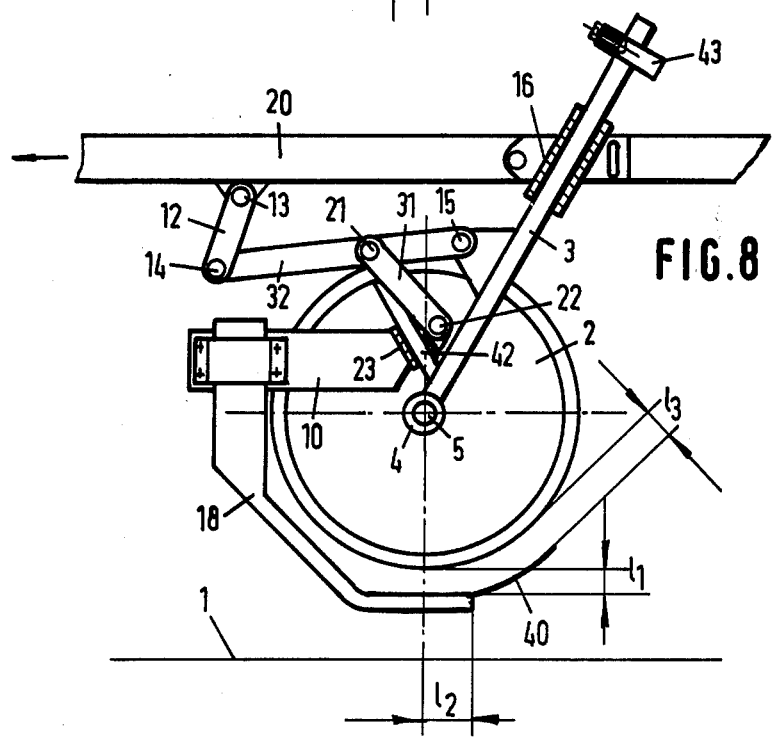
Figure 11:
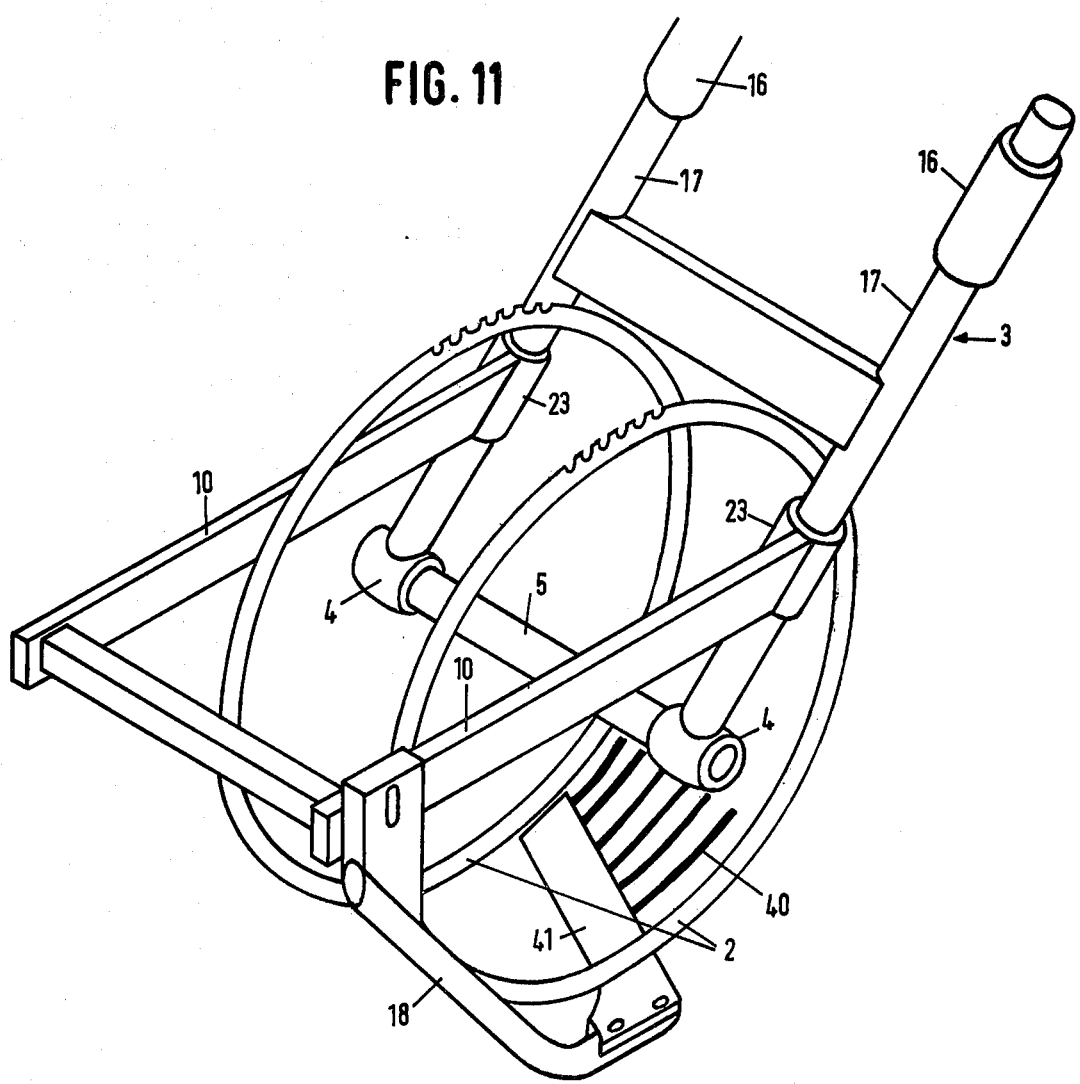

A number of embodiments of the beet topping device, in particular the feeler and topping portion, will now be described by way of example, with reference to the accompanying drawings, wherein FIGS. 1 and 2 are a diagrammatic side view of a single-row beet topping device, wherein the line of action of the sliding joint of the quadrangular linkage is vertical to the frame of the beet topping device and coincides with the line of action of the sliding joint of the connection arm which connects the blade holder with the feeler arm, while FIG. 1 relates to the situation in which the feeler rides over a small beet, not shown, consequently projecting slightly above the soil and FIG. 2 shows the situation in which the feeler rides over a beet that is relatively larger with respect to that of FIG. 1, hence further projecting above the soil, FIGS. 3 and 4 show the beet topping device according to FIG. 1 respectively FIG. 2 in an embodiment wherein the line of action of the sliding joint of the quadrangular linkage with the frame lies at an angle to the vertical and coincides with the line of action of the sliding joint of the connection arm connecting the blade holder to the feeler arm, FIGS. 5 and 6 show an embodiment wherein the line of action of the sliding joint with the frame lies at an angle to the vertical and to the line of action of the sliding joint of the connection arm which is directed vertically, FIGS. 7 and 8 show an embodiment wherein the line of action of the sliding joint with the frame and the line of action of the sliding joint of the connection arm connecting the blade holder to the feeler arm, lie mutually at an angle and each thereof to the vertical, FIGS. 9 and 10 show an embodiment wherein the line of action of the sliding joint with the frame is inclined at an angle to the vertical and, spaced apart therefrom, is parallel to the line of action of the sliding joint of the connection arm connecting the blade holder to the feeler arm, FIG. 11 is a perspective view of the feeler arm portion and the topping blade arm portion, both designed as two-legged fork constructions, FIG. 12 is a diagrammatic top view of the feeler arm portion and the blade holder with topping blade and feeler, FIG. 13 enlarged in top view shows the topping blade provided at the side facing away from the cutting face with guide rods, FIG. 14 in side view shows the topping blade according to FIG. 13, and FIG. 15 is a cross section of the topping blade on the line XV—XV in FIG. 13.

The same reference numerals in the figures designate members having the same function.

In the drawing 1 indicates the ground level diagrammatically. The feeler, having a cylindrical shape, is shown by 2 and is via bearings 4 rotatably connected about the shaft 5 to the feeler arm 3, which may be designed as a two-legged fork having legs 17 (FIGS. 11 and 12).

The feeler arm 3 in the first coupling point is slidably connected to frame 20 via sliding joint 16 (FIGS. 1–8).

The cutting member of the device according to the invention comprises a topping blade arm 6 which at the one end thereof in the second coupling point is rotatably connected to the frame 20 about a shaft 13. The topping blade arm 6 is composed of rods 12 and 32, link 31, the connection arm 10 and the blade holder 18.

The blade holder 18 at its free end (FIG. 12) is the topping blade 41 carrying portion of the topping blade arm 6. The elongate blade of the topping blade indicates with the cutting edge thereof the transport direction of the beet topping device indicated by arrows. The blade holder 18, seen in the direction of travel, has an outwardly curved shape so that blade holder 18 during the advance of the beet topping device, has a haulm-guiding function. The flat end of the blade holder 18, not carrying the blade, is accommodated in a broader slot in the connection arm 10, and is adjustably connected therewith by means of set bolts. By loosening the set bolts the blade holder 18 within the broader slot can be shifted to a different position and afterwards be secured again.

The connection arm 10 connects the blade holder 18 to the feeler arm 3.

The portion formed by rods 12 and 32 associated with the topping blade arm 6, together with frame 20 and feeler arm 3 likewise forms part of the quadrangle construction or quadrangular linkage which in the angular points is rotatable about the shafts 13, 14, 15, respectively slidable in the fourth angular point via the sliding joint 16.

The quadrangular linkage 13-14-15-16 is always connected through link 31 via connection arm 10 to the blade-carrying portion of the beet topping device.

It will be apparent from a comparison of FIGS. 2 and 1 that the position of the end of blade holder 18 relative to the feeler 2 and consequently the distance l1 between the topping blade 41 connected to the end and the feeler, respectively the distance between the topping blade and ground level 1 is controlled by the position of the feeler arm and the quadrangular linkage 13-14-15-16 relatively to each other, in conjunction with the positioning of the shaft 5 of the feeler outside the quadrangular linkage. The effect of the quadrangular linkage during the upward movement of the feeler, when it travels over a large beet, as diagrammatically shown in FIG. 2 in relation to FIG. 1, is that relative to the ground level both feeler and topping blade move upwardly without rotation of the blade, however, the topping blade 40 less than the feeler 2, so that the relative distance l1 between the topping blade and the feeler increases. This is also desirable, since a larger beet depth has to be topped. On the other hand during the travel of the feeler 2 over a smaller beet, the distances from the feeler to the topping blade, respectively from the topping blade to the ground level will both decrease, but the distance l1 between feeler and topping blade to a stronger extent. This is in accordance with the condition that of a smaller beet a less deep piece has to be topped.

The distance L2 in the embodiment of the device shown in FIGS. 1 and 2, always remains constant.

The embodiment shown in FIGS. 3 and 4, in which respect FIG. 4 relative to FIG. 3 again relates to the situation that the feeler travels over a larger beet, is analogous to that according to FIG. 1 and FIG. 2, on the understanding that the coinciding lines of action of the sliding joints 16 and 23 are inclined at an angle to the vertical in such a way that, seen in the direction of travel, the lines of action slope backwardly. This construction entails that, if during the application of the beet topping device, the distance L1 is changed, e.g. is increased as in FIG. 4, also the distance L2 is changed, i.e. is reduced.

The backwardly inclined arrangement of the feeler arm 3 is stronger in practice and is advantageous in that the forces exerted on the feeler 2 during the advance of the beet topping device, can be better absorbed via the telescoping arrangement of the feeler arm 3 and the sliding joints 16 and 23. Consequently the embodiments of the device according to the invention wherein the feeler arm is arranged backwardly inclined in general is preferable to that wherein the feeler arm is vertically arranged.

In FIGS. 5 and 6 there is shown an embodiment in which the lines of action of the sliding joints 16 and 23 no longer coincide but lie at an angle relative to each other. To this effect there is provided an auxiliary arm 42 by means of which the connection arm 10 is connected via the sliding joint 23 for up and down sliding movement.

In the embodiment shown in FIGS. 5 and 6 the auxiliary arm 42 is vertically oriented, while said auxiliary arm 42 according to the embodiment shown in FIGS. 7 and 8 is disposed forwardly inclined to the left. The construction applied in FIGS. 5 and 6, respectively 7 and 8 again has an effect on the relation between the distances L1 and L2 upon practical application of the beet topping device, in such a way that if L1 is changed, L2 according to FIGS. 5 and 6 remains unchanged, while on the other hand in the embodiment shown in FIGS. 7 and 8, in case of variable L1 also L2 is variable in the sense that if L1 becomes larger also L2 becomes larger.

FIGS. 9 and 10 show an embodiment wherein basically frame 20 in an effectively chosen location, is extended via the frame extension arm 20a, which at the connection 20b is connected to the frame 20 (the quadrangular construction or quadrangular linkage in this embodiment has the angular points 13, 14, 15 and 20b). The frame extension arm 20a is then utilized as guiding member around which the feeler arm 3 is moved up and down via the sliding joint 16. This embodiment has the advantage that during the up and down movement less mass is concerned.

Also in the embodiment shown in FIGS. 9 and 10, there is provided an auxiliary arm 42, the position of which, besides the position shown, may furthermore be so that the auxiliary arm 42 is directed according to the vertical, respectively disposed depending to the right. In the position shown in FIG. 9 and FIG. 10 of the auxiliary arm 42, which parallels the frame extension member 20a so that also the lines of action of the sliding joints 16, respectively 23 are mutually parallel, the relation between L1 and L2 upon variation of L1 is analogous to that of the embodiment shown in FIG. 3 and FIG. 4. Summarizing, in case of change of position of the auxiliary arm 42 of the embodiment shown in FIG. 9 and FIG. 10 wherein the auxiliary arm 42 depends downwardly to the left via the vertical position to the position depending downwardly to the right, upon application in practice relative to the interaction of the distances L1 and L2, any combination can be realized as in the embodiment shown in FIGS. 3 and 4; 5 and 6; and 7 and 8, viz. that at increasing L1 the distance L2 thereby becomes smaller, equal or larger.

Of the embodiments shown in FIGS. 3-10, the one shown in FIGS. 3 and 4 is particularly preferred.

One of the reasons is connected with the fact that at the topping blade 41 at the side opposite the cutting face, there are secured guide rods 40 (FIG. 12) which are mutually parallel and curved in accordance with the curved feeler surface. Said guide rods also serve for a proper discharge of the waste obtained during topping. If now during the travelling with the beet topping device according to FIGS. 3 and 4, L2 becomes smaller (in that L1 becomes larger), also the distance L3 between the ends of the guide rods 40 and the feeler surface becomes larger, however, considerably less than in the embodiment shown in FIGS. 7 and 8, wherein at increasing L2 the value L3 becomes much larger, thus producing for the beet haulm to be further conducted and discharged by means of the guide rods, a greater slip, which is disadvantageous for a proper discharge.

Another advantage of the embodiment shown in FIGS. 3 and 4 is that if during the travelling L1 become larger and hence L2 smaller, the associated value L3, in comparison with the value L3, is smallest in all other embodiments. Consequently, during the rolling of the feeler 2 off a large beet to a small beet, the smaller beet, also in case of a much shorter distance to the preceding large beet, may be cut and topped by the topping blade 41 at the approach side thereof. The embodiment shown in FIG. 3 and FIG. 4 in other words makes it possible that the beets, large and small together, may be disposed closer to each other.

Since, as mentioned in the above, a relatively small distance between the guide rods and the feeler surface enhances the proper discharge of the topped beet haulm material, and if a topping blade 41 is utilized as shown in FIG. 12 and FIG. 13, which is arranged at an angle α (FIG. 12) to the transport direction, said topping blade is so secured that the free end thereof is lifted slightly from the horizontal plane in the direction of the feeler surface (FIG. 14), in order to render the distance L3 between the free ends of the guide rods and the feeler surface as much as possible equal to that of the guide rod ends disposed at the side of the blade holder 18.

In order to benefit from the major advantage offered by the beet topping device according to the invention, viz. the realization within broad limits of any desired relation between the changes of the distances L1 and L2, it is preferably ensured that in all embodiments to be realized according to the invention, the suspension of the quadrangular linkage and hence of the feeler and the blade-carrying portion at the frame is adjustable. For instance, with reference to the embodiment shown e.g. in FIG. 3 and FIG. 4, preferably the position, e.g. the angle of inclination of the sliding joint 16 relative to the frame 20, will be made adjustable in combination with an adjustable design of the connection of the blade holder 18 with the connection arm 10 and of the link 31 with the connection arm 10 and/or the quadrangular construction or quadrangular linkage. It is thus possible, depending on the working conditions, to always previously realize an optimal adjustment of the starting values L1 and L2.

The preference for an adjustability of the suspension applies to all embodiments of the device according to the invention, naturally tuned to the type in question. For instance in the embodiments wherein an auxiliary arm 42 is provided, also the position, consequently the angle of inclination, of the auxiliary arm will be of an adjustable design. In the embodiment shown in FIG. 9 and FIG. 10, moreover the connection 20b of the frame extension member 20a to frame 20 will be adjustable.

In the drawing 43 indicates yet a limiting member, e.g. a stop by means of which the travel distance of the sliding movement within the sliding joint 16 is limited for the depth stop.

For the sliding joints 16 and 23, a suitable use may be made of so-called ball boxes, such as the commercially available products marketed under the name of STAR-Super-ball box. Such a ball box comprises a guide housing with external sleeve of polyamide material 6.6, balls of alloy steel and inserts of hardened steel which take up the load. Naturally it is ensured that the running surface of the arm around which the sliding joint is slidable, is protected against dirt, e.g. by means of a zigzag bellows made of a flexible material, such as rubber.

The beet topping device according to the invention, as described in the above and shown in the drawing, may be altered yet without leaving the scope of the invention. For instance it may be designed as a multi-row device, for instance as a six-row device.

It is likewise possible to shorten the connection arm 10 shown in FIGS. 7 and 8 in such a way that the connection with the link 31 through the intermediary of shaft 22 in FIGS. 7 and 8 comes to lie at the left of the auxiliary arm 42'. Such a feature is also possible in the embodiment shown in FIGS. 5 and 6. An advantage of the position of the auxiliary arm 42 shown in FIGS. 7 and 8 is that as a result the link 31 and the auxiliary arm 42 are more parallel to each other, which results in a better transmission of forces.

Furthermore it can be pointed out that the lengths of each of the different rods, e.g. 12 and 32 and link 31 may be adapted yet if this is desired for constructive reasons, so that also rods of unequal lengths may be utilized.

Also, the feeler need not necessarily have a rollable, cylindrical shape, but may also have an embodiment wherein the feeler is dragged over the ground.

What I claim is:

1. A beet topping device transportable over the ground comprising:
   (a) a frame (20) having a leading side and a trailing side;
   (b) a feeler arm (3) slidably mounted to said frame for vertically-extensive movement;
   (c) a feeler mounted to said feeler arm for movement therewith;
   (d) a plurality of rods (12, 32), said rods being pivotally connected to one another, one of said rods being pivotally connected to said frame at a coupling point for movement about a horizontal axis, an other one of said rods being connected to said feeler arm so that said rods, feeler arm and frame cooperatively constitute a deformable polygonal linkage;
   (e) a connection arm (10) slidably connected to said feeler arm, said connection arm also being linked to said other one of said rods so that upon upward displacement of said feeler arm said connecting arm will be displaced upwardly to a lesser extent than said feeler arm; and
   (f) a topping blade disposed below said feeler, said blade having a cutting edge directed toward the leading side of said frame, said blade being attached to said connection arm for movement therewith, whereby the vertical distance between said blade and said feeler will increase upon upward displacement of said feeler.

2. A device according to claim 1, characterized in that the line of action of the sliding joint (16) between said feeler arm and said frame lies at an angle to the vertical.

3. A device according to claim 1 or claim 2, characterised in that the line of action of the sliding joint (23) between said connection arm and said feeler arm and the line of action of the sliding joint (16) between said feeler arm and said frame, extend parallel to each other.

4. A device according to claim 1 or claim 2, characterised in that the line of action of the sliding joint (23) between said connection arm and said feeler arm and the line of action of the sliding joint (16) between said feeler arm and said frame, are disposed at an angle relative to each other.

5. A device according to claim 1, characterised in that the feeler arm (3) and the connection arm (10) are designed as two-legged fork constructions.

6. A device according to claim 3, characterised in that the lines of action of the sliding joints coincide.

7. A device according to claim 1, characterised in that said linkage is quadrangular and includes only two of said rods.

8. A device according to claim 7, characterised in that said rods are of unequal length.

9. A device according to claim 7, further comprising a link (31) pivotally connected to said other one of said rods, said link also being pivotally connected to said connection arm, said connection arm being linked to said other one of said rods by said link.

10. A device according to claim 1, characterised in that said blade is adjustably attached to said connection arm.

11. A device according to claim 1, characterised in that at least one element of said polygonal linkage is adjustable.

12. A device according to claim 1 further comprising an auxiliary arm (42) attached to said feeler arm, said connection arm being slidably connected to said feeler arm by way of said auxiliary arm.

13. A device according to claim 12, characterised in that said auxiliary arm is adjustably attached to said feeler arm.

* * * * *